(12) United States Patent
Pappalardo et al.

(10) Patent No.: US 6,351,110 B1
(45) Date of Patent: *Feb. 26, 2002

(54) BATTERY CHARGER WITH CURRENT REGULATING CIRCUIT

(75) Inventors: Salvatore Pappalardo, Catania; Francesco Pulvirenti, Acireale, both of (IT)

(73) Assignee: STMicroelectronics S.r.l., Agrate Brianza (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/561,410

(22) Filed: Apr. 27, 2000

(30) Foreign Application Priority Data

Apr. 29, 1999 (EP) .............................. 99830258

(51) Int. Cl.[7] .................................. G05F 1/40
(52) U.S. Cl. .................. 323/285; 323/316; 320/140; 320/164
(58) Field of Search .................. 323/282, 284, 323/285, 316; 320/140, 164

(56) References Cited

U.S. PATENT DOCUMENTS

| 5,084,811 | A | | 1/1992 | Maige et al. .................. 363/49 |
| 5,731,692 | A | * | 3/1998 | Garcia ........................ 323/274 |
| 5,945,819 | A | * | 8/1999 | Ursino et al. ............... 323/282 |
| 6,009,000 | A | * | 12/1999 | Siri ............................. 363/21 |
| 6,011,707 | A | * | 1/2000 | Mine ........................... 363/89 |

FOREIGN PATENT DOCUMENTS

| EP | 0 582 814 | 2/1994 |
| EP | 0 752 748 | 1/1997 |

* cited by examiner

Primary Examiner—Shawn Riley
(74) Attorney, Agent, or Firm—Lisa K. Jorgenson; E. Russell Tarleton; Seed IP Law Group, PLLC

(57) ABSTRACT

A DC-DC converter including a current error amplifier and a voltage error amplifier connected in parallel to control the charging phase of the battery, during which a charging current is supplied to the battery to bring the voltage of the battery gradually up to a full charge voltage; a charging interruption stage for interrupting the charging phase before the voltage of the battery has reached the full charge voltage; and an activation stage for activating the charging interruption stage when the full charge voltage is close to the supply potential at which the supply line of the current error amplifier is set.

34 Claims, 5 Drawing Sheets

BATTERY CHARGER WITH CURRENT REGULATING CIRCUIT

TECHNICAL FIELD

The present invention refers to a DC-DC converter usable as a battery charger and to a method for charging a battery.

BACKGROUND OF THE INVENTION

For charging batteries, for example batteries of cell phones, the use of DC-DC converters operating as battery chargers and able to perform various charging algorithms for NiCd, NiMH and LiIon batteries is known.

FIG. 1 illustrates a known step-down DC-DC converter usable as a battery charger.

The DC-DC converter, indicated as a whole by the reference number 1, comprises a switch 2, for example formed of a MOS transistor, the opening and closing whereof is controlled by a driving stage 4, and presenting a first terminal connected to a supply line 6 biased at the voltage VCC and a second terminal connected, via a diode 8, to ground; an inductor 10 and a sense resistor 12 series-connected between the second terminal of the switch 2 and a node 14, which is in turn connected, via a diode 16, to a positive pole of the battery 18 to be charged, which presents its negative pole connected to ground; a capacitor 20 connected between the node 14 and ground; and a voltage divider 22, formed of two resistors 24, 26, connected in parallel to the battery 18, and presenting an intermediate node 28 on which it supplies a voltage VFB proportional, through the division ratio, to the voltage VBAT present between the poles of the battery 18.

The DC-DC converter 1 further comprises a differential voltage error amplifier 30 presenting an inverting terminal connected to the intermediate node 28 of the voltage divider 22 and receiving from the latter the voltage VFB, a non-inverting terminal receiving a reference voltage VREF, and an output terminal connected to an output node 32; a differential current error amplifier 34 presenting an inverting terminal and a non-inverting terminal connected across the sense resistor 12, and an output terminal connected to a node 36 of an output stage 38 of the voltage error amplifier 30, which is thus shared between the voltage error amplifier 30 and the current error amplifier 34; and an offset voltage generator 40 supplying an offset voltage VOFFS and interposed between the inverting terminal of the current error amplifier 34 and a terminal of the sense resistor 12.

The voltage error amplifier 30 and the current error amplifier 34 are biased through respective current generators 44, 46, supplying, respectively, a bias current IV and a bias current IP which are both of constant value.

The function of the offset voltage generator 40 is that of programming the charging current IBAT of the battery 18. In fact, when the current error amplifier 34 is balanced, i.e., when the voltage between the inverting terminal and the non-inverting terminal is substantially zero, in the sense resistor 12 there flows a current which determines across it a voltage drop equal, and with opposite sign, to the offset voltage VOFFS, and this current defines the battery charging current IBAT. For example, in order to program a 1-A battery charging current using a 0.1-Ω sense resistor, it is sufficient to generate a 100-mV offset voltage.

Finally, the DC-DC converter 1 comprises a zero-pole compensation network 48 including a resistor 50 and a capacitor 52 series-connected between the output node 32 and ground; and a differential comparator 54 known as PWM (Pulse Width Modulator) comparator, presenting an inverting terminal receiving a comparison voltage VC which has a sawtooth waveform, a non-inverting terminal connected to the output node 32, and an output terminal connected to the input of the driving stage 4 of the switch 2, basically operating as pulse width modulator and supplying at an output a voltage having a square waveform, and the duty cycle whereof is a function of the voltage present on the node 32.

The output stage 38 of the voltage error amplifier 30 comprises a current mirror 60 including a first and a second NMOS transistor M11, M12 having gate terminals connected together and to the drain terminal of the transistor M11, source terminals connected to ground, and drain terminals connected to respective loads, each of which consists of a PMOS transistor M9, M10, connected in turn to a supply line 80 set at the voltage VREG. In addition, the drain terminal of the transistor M11 defines the node 36 to which the output terminal of the current error amplifier 34 is connected.

The operation of the DC-DC converter 1 is as follows. During the battery charging phase, the current error amplifier 34 prevails over the voltage error amplifier, and the DC-DC converter 1 operates in a current regulation condition, behaving as a constant current generator and regulating the voltage present across the sense resistor 12 so that this will assume a value equal to that of the offset voltage VOFFS supplied by the offset voltage generator 40.

In particular, during the current regulation phase, the current error amplifier 34 supplies at an output the current IOUT necessary for maintaining the output stage 38 in equilibrium for the entire duration of the battery charging phase, and controls, via the comparator 54, the duty cycle of the signal supplied by the comparator 54 itself so as to render the voltages present on its own inverting and non-inverting terminals equal.

The current error amplifier 34 performs a negative feedback. In fact, a possible variation in the battery charging current IBAT results in an unbalancing of the current error amplifier 34, with consequent variation in the voltage of the output node 32, and hence of the duty cycle of the output signal of the comparator 54, which acts to restore the programmed value of the battery charging current IBAT.

During the current regulation phase, the battery 18 is thus charged with a constant current according to the value programmed via the offset voltage generator 40, and the battery voltage VBAT increases progressively towards the full charge value VFIN up to which the voltage of the battery 18 is to be brought.

The current error amplifier 34 prevails over the voltage error amplifier 30 as long as the voltage error amplifier 30 is unbalanced, i.e., as long as the voltage VFB is lower than the reference voltage VREF, and hence the differential input voltage ΔV=VREF−VFB present between the input terminals of the voltage error amplifier 30 is positive.

When the battery voltage VBAT approaches the full charge value VFIN, the differential input voltage ΔV=VREF−VFB present between the input terminals of the voltage error amplifier 30 approaches zero, the current error amplifier 34 unbalances, whilst the voltage error amplifier 30 is in equilibrium and thus prevails over the current error amplifier 34, so imposing a decrease in the battery charging current IBAT; the DC-DC converter 1 therefore enters the voltage regulation phase in which the voltage error amplifier 30 controls the battery voltage VBAT.

FIG. 2 shows a more detailed circuit diagram of the current error amplifier 34 and of the voltage error amplifier 30, in which parts that are identical or equivalent to those of FIG. 1 are identified by the same reference numbers or letters.

According to what is illustrated in FIG. 2, the current error amplifier 34 presents a differential input stage 70 with PNP bipolar transistors in Darlington configuration so as to be compatible to ground.

In detail, the differential input stage 70 comprises a pair of PNP bipolar transistors Q1, Q2 connected in differential configuration, which present source terminals connected together and to the current generator 46 supplying the bias current IP, the current generator 46 being in turn connected to the supply line 6, collector terminals connected to respective loads, and base terminals connected to the emitter terminals of respective PNP bipolar transistors Q3, Q4 defining, together with the transistors Q1 and Q2, two Darlington pairs and presenting collector terminals connected to ground and base terminals connected across the sense resistor 12.

The differential input stage 70 further comprises a pair of current generators 72 supplying equal currents IOFFS and being connected between the base terminal of the transistor Q1 and of the transistor Q2, respectively, and the supply line 6; and a resistor 74 interposed between the base terminal of the transistor Q1 and the emitter terminal of the transistor Q3 and defining, together with the current generator 72, the offset voltage generator 40 (FIG. 1) described previously.

The load of the transistor Q2 consists of an NPN bipolar transistor Q6, which is diode-connected, i.e., which has the emitter terminal connected to ground and the base and collector terminals connected together and to the collector terminal of the bipolar transistor Q2.

The load of the transistor Q1 consists of one of two NPN bipolar transistors Q5, Q7 forming a current mirror 76 having a unity mirror ratio. In particular, the transistors Q5, Q7 present emitter terminals connected to ground and base terminals connected together; in addition, the transistor Q5 is diode-connected and constitutes the load of the transistor Q1, i.e., it presents the collector terminal which is connected both to its own base terminal and to the collector terminal of the transistor Q1, whilst the collector terminal of the transistor Q7 is connected to one of two PMOS transistors MA, MB forming a current mirror 78 that has a unity mirror ratio. The transistors MA, MB present source terminals connected to the supply line 80 set at the voltage VREG, and gate terminals connected together and to the drain terminal of the transistor MA, which is in turn connected to the collector terminal of the transistor Q7; in addition, the drain terminal of the transistor MB constitutes the output terminal of the current error amplifier 34, on which the current IOUT is supplied and which is connected to the node 36 of the output stage 38 of the voltage error amplifier 30.

The voltage error amplifier 30 comprises a differential input stage 84 formed of a pair of PMOS transistors M1, M2 connected in differential configuration and presenting source terminals connected together and to the current generator 44 supplying the bias current IV, which in turn is connected to the supply line 80, drain terminals connected to respective loads, and gate terminals receiving the voltage VREF and the voltage VFB.

The load of the transistor M1 consists of one of two NMOS transistors M3, M5 forming a current mirror 86 having a unit mirror ratio, whilst the load of the transistor M2 consists of one of two NMOS transistors M4, M6 forming a current mirror 88 having a unit mirror ratio.

In particular, the transistors M3 and M5 present source terminals connected to ground and gate terminals connected together; in addition, the transistor M3 is diode-connected and constitutes the load of the transistor M1, i.e., it presents the drain terminal that is connected both to its own gate terminal and to the drain terminal of the transistor M1. The transistors M4 and M6 present source terminals connected to ground and gate terminals connected together; in addition, the transistor M4 is diode-connected and constitutes the load of the transistor M2, i.e., it presents the drain terminal that is connected both to its own gate terminal and to the drain terminal of the transistor M2.

The drain terminal of the transistor M5 is connected to one of two PMOS transistors M7, M9 forming a current mirror 90 having a unity mirror ratio, whilst the drain terminal of the transistor M6 is connected to one of two PMOS transistors M8, M10 forming a current mirror 92 having a mirror ratio equal to N.

In particular, the transistors M7 and M9 present source terminals connected to the supply line 80 and gate terminals connected together; in addition, the transistor M7 is diode-connected and constitutes the load of the transistor M5, i.e., it presents the drain terminal that is connected both to its own gate terminal and to the drain terminal of the transistor M5. The transistors M8 and M10 present source terminals connected to the supply line 80 and gate terminals connected together; in addition, the transistor M8 is diode-connected and constitutes the load of the transistor M6, i.e., it presents the drain terminal that is connected both to its own gate terminal and to the drain terminal of the transistor M6.

The drain terminal of the transistor M9 is connected to a first one of two NMOS transistors M11, M12 forming a current mirror 94 having a mirror ratio equal to N, whilst the drain terminal of the transistor M10 is connected to the second one of the two transistors M11, M12 of the current mirror 94. In particular, the transistors M11 and M12 present source terminals connected to ground and gate terminals connected together; in addition, the transistor M11 is diode-connected and constitutes the load of the transistor M9, i.e., it presents the drain terminal that is connected both to its own gate terminal and to the drain terminal of the transistor M9, whilst the transistor M12 constitutes the load of the transistor M10 and presents the drain terminal that is connected to the drain terminal of the transistor M10. The drain terminals of the transistors M9 and M11 further define the node 36 to which the drain terminal of the transistor MB is connected.

FIG. 3 illustrates in greater detail the circuit diagram of the current generator 46 supplying the bias current IP.

According to the illustration of FIG. 3, the current generator 46 formed of four PMOS transistors MS1, MS2, MS3, and MS4 connected in such a way as to define two current mirrors set according to a cascode structure, so as to increase the output impedance of the current generator 46 in order to render the bias current IP supplied to the input stage 70 more precise.

In particular, the transistor MS4 presents the gate terminal connected to the gate terminal of the transistor MS2, the drain terminal connected to the emitter terminals of the transistors Q1 and Q2, and the source terminal connected to the drain terminal of the transistor MS3, which in turn presents its source terminal connected to the supply line 6 and its gate terminal connected to the gate terminal of the transistor MS1.

The transistor MS1 presents its source terminal connected to the supply line 6 and its drain terminal connected to the source terminal of the transistor MS2, which in turn presents its drain terminal connected to a current generator 96 which supplies a reference current IPO and which is in turn connected to ground.

One drawback of the DC-DC converter 1 described above lies in the circuit topology with which the current generator 46 is made, in that this circuit topology causes anomalous operation of the DC-DC converter 1 when the full charge voltage VFIN up to which the battery voltage must be brought at end of charge is very close to the voltage VCC at which the supply line 6 is set.

In fact, during the charging phase at constant current, the battery voltage VBAT continues to increase gradually towards the full charge value VFIN, and, in order for regulation to continue operating properly, the transistors MS3 and MS4, which mirror the current IP, must operate in the saturation region, i.e., for each of them we must have VDS>VGS−VTH, where the voltage VDS is the voltage between the drain and source terminals, the voltage VGS is the voltage between the gate and source terminals, and the voltage VTH is the threshold voltage of the transistors MS3 and MS4.

Designating with VSAT the voltage present across the transistors MS3 and MS4, i.e., the voltage present between the supply line 6 set at the voltage VCC and the voltage of the emitter terminals of the transistors Q1 and Q2 of the input stage 70, with $VDS_{MS3}$ and $VDS_{MS4}$ the voltages present between the drain and source terminals of the transistors MS3 and MS4, respectively, with VCS1 and VCS2 the voltages present on the base terminals of the transistors Q4 and Q3, respectively, and with $VBE_{Q1}$, $VBE_{Q2}$, $VBE_{Q3}$, and $VBE_{Q4}$ the voltages present between the base and emitter terminals of the transistors Q1, Q2, Q3, and Q4, respectively, we have $$VSAT=VDS_{MS3}+VDS_{MS4}=VCC-VCS1-VBE_{Q2}-VBE_{Q4}=VCC-VCS2-VOFFS-VBEQ1-VBEQ3$$

from which it is found that the voltage VSAT decreases as the voltage VCS2, i.e., the battery voltage VBAT, increases.

If the full charge value VFIN of the battery voltage VBAT is close to the voltage VCC, the voltage VSAT decreases to such a point that the transistors MS3 and MS4 work in the triode region, and this means that the bias current IP will be smaller than the reference current IPO necessary for keeping the DC-DC converter 1 operating in the current regulation condition as described above.

Consequently, if the current IOUT required remains unvaried, the current flowing in the transistor Q2 will be smaller than the current that was flowing in the transistor Q2 before the transistors MS3 and MS4 entered the triode region, and this implies that the current flowing in the transistor Q1 will be greater than the current flowing in the transistor Q2, and that hence the input stage 70 of the current error amplifier 34 Is no longer balanced. Since, however the transistors Q1 and Q2 have their emitter terminals coupled together, this means also that the base-emitter voltage of the transistor Q1 is smaller than the base-emitter voltage of the transistor Q2, and hence the voltage VCS2 present on the base terminal of the transistor Q3 differs from the voltage VCS1 present on the base terminal of the transistor Q4 by an amount greater than the offset voltage VOFFS, i.e., between the inverting and non-inverting terminals of the current error amplifier 34 there is a differential voltage greater than the offset voltage VOFFS.

Consequently then, the battery charging current IBAT is no longer kept at the programmed value but starts to increase more and more. In fact, as the battery voltage VBAT increases, and hence likewise the voltage VCS2, the amount of the unbalance of the current error amplifier 34 becomes greater in that the voltage VSAT decreases, the transistors MS3 and MS4 work increasingly in the triode region, and the bias current IP continues to decrease.

The charging current thus presents a peak at which the battery voltage VBAT, which at constant current follows a linear pattern, now undergoes a sharp increase, reaching in less time a final value that in some conditions may also be different from the full charge value VFIN.

FIG. 4 presents the patterns, as a function of time, of the battery charging current IBAT and of the battery voltage VBAT, which reveal the anomalous behavior of the DC-DC converter 1 when the full charge voltage VFIN is close to the voltage VCC of the supply line 6.

The peak value of the charging current IBAT and its temporal duration depend upon many factors, among which the difference between the voltage VCC of the supply line 6 and the full charge voltage VFIN of the battery 18, and the time constant of the compensation network 48 which influences the time of response of the DC-DC converter to a variation in the operating conditions.

In any case, the voltage present on the output node 32 to which the output stage 38 shared between the current error amplifier 34 and the voltage error amplifier 30 is connected tends to increase, forcing the driving stage 4 of the switch 2 to work with an increasingly greater duty cycle, and this means that, depending upon the value of the difference between the voltage VCC of the supply line 6 and the battery full charge voltage VFIN, and upon the battery charge state at the moment in which the transistors MS3 and MS4 enter the triode region, it may happen that the voltage of the node 32 reaches high values such as to force the transistor M10 of the output stage 38 shared between the voltage error amplifier 30 and the current error amplifier 34 to work in the triode region. In these conditions, the current supplied by the transistor M10 decreases rapidly, and consequently the charging current IBAT will undergo a sharp decrease after the peak, since the current error amplifier 34 will be completely unbalanced, and the current IOUT supplied by it and required to balance the node 32 will be a very small fraction of the bias current IP and will flow almost entirely in the transistor Q2; the battery 18 will thus continue being charged with a very small current.

In practice, when the full charge value VFIN of the voltage VBAT of the battery 18 is close to the voltage VCC, the DC-DC converter is no longer able to supply a constant charging current IBAT to the battery 18, which is subjected to sudden voltage variations that may damage it.

In addition, if the duration of the current peak that occurs in this phase exceeds a certain time interval, the high current value that the DC-DC converter 1 Supplies in this phase may damage the DC-DC converter itself.

SUMMARY OF THE INVENTION

The disclosed embodiments of the present invention provide a DC-DC converter usable as a battery charger, which is able to protect the battery that it charges against the current peaks that are generated when the full charge voltage VFIN, up to which the battery voltage is to be brought, is close to the voltage VCC with which the current error amplifier is supplied.

The embodiments of the present invention also provide a method for charging a battery carried out by means of a DC-DC converter that is able to protect the battery being charged by it against the current peaks that are generated when the full charge voltage VFIN up to which the battery voltage is to be brought is close to the voltage VCC with which the current error amplifier is supplied.

In one embodiment of the present invention, a DC-DC converter is provided that includes a current error amplifier and a voltage error amplifier connected in parallel to control the charging phase of the battery during which a charging current is supplied to the battery to bring the voltage of the battery gradually up to a full charge; a charging interruption stage for interrupting the charging phase before the voltage of the battery has reached the full charge voltage; and an activation stage for activating the charging interruption stage when the full charge voltage is close to the supply potential at which the supply line of the current error amplifier is set.

BRIEF DESCRIPTION OF THE DRAWINGS

For a better understanding of the present invention, a preferred embodiment thereof is now described, simply with the purpose of providing a non-limiting example, with reference to the attached drawings, in which.

DETAILED DESCRIPTION OF THE INVENTION

The disclosed embodiments of the present invention are based on the principle of defining a current shunting path having the purpose of starting to shunt part of the bias current IP supplied to the input stage of the current error amplifier before the battery voltage reaches values such as to cause the transistors MS3 and MS4 to enter the triode operating region, so as to protect the converter and the battery that it is charging from sudden current peaks that may occur in the operating conditions described previously. i.e., when the battery full charge voltage VFIN is close to the voltage VCC.

Figure 1:
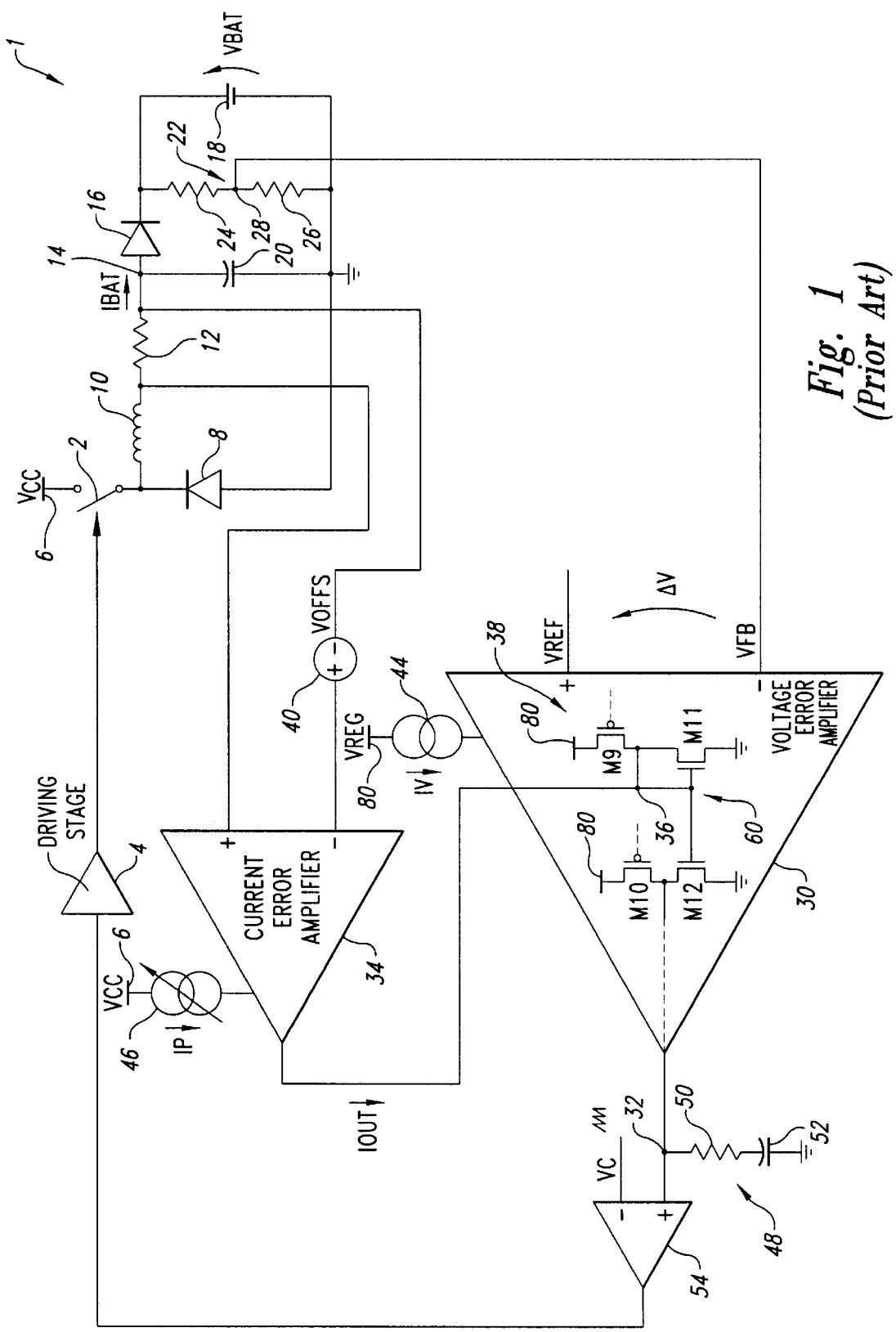
FIG. 1 shows a circuit diagram of a DC-DC converter usable as a battery charger.
Figure 2:
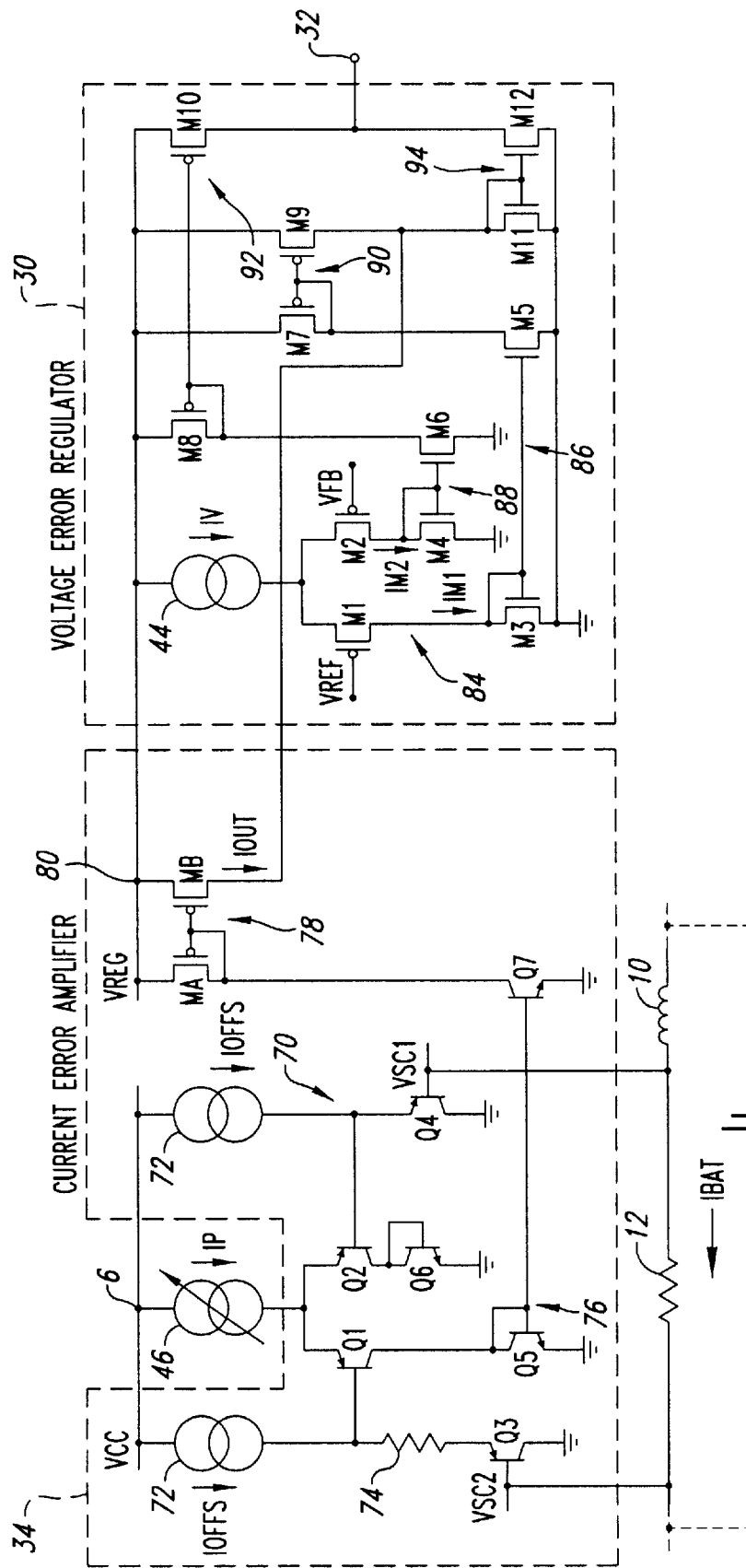
FIGS. 2 and 3 show more detailed circuit diagrams of amplifiers forming part of the DC-DC converter of FIG. 1.
Figure 3:
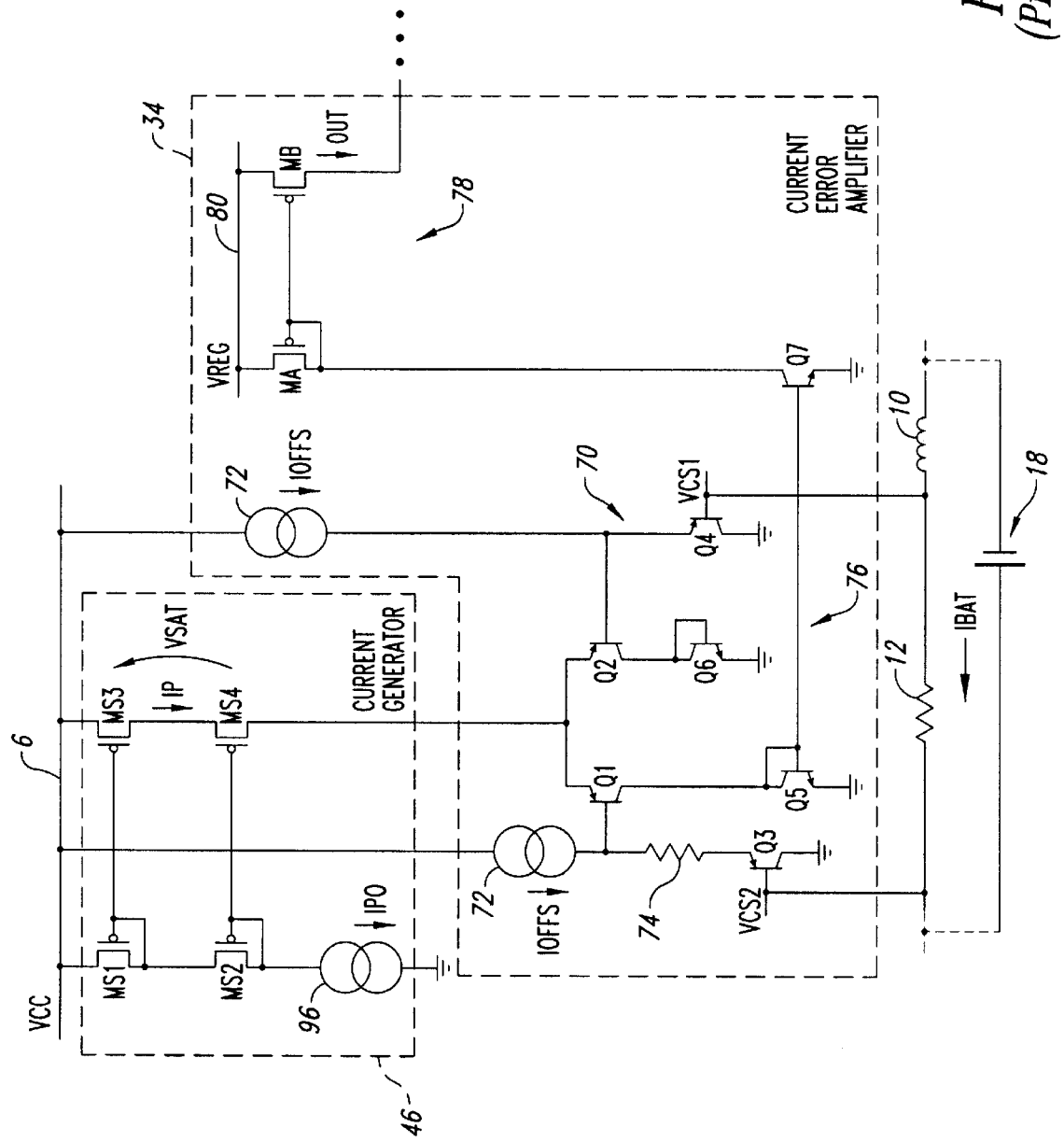
Figure 4:
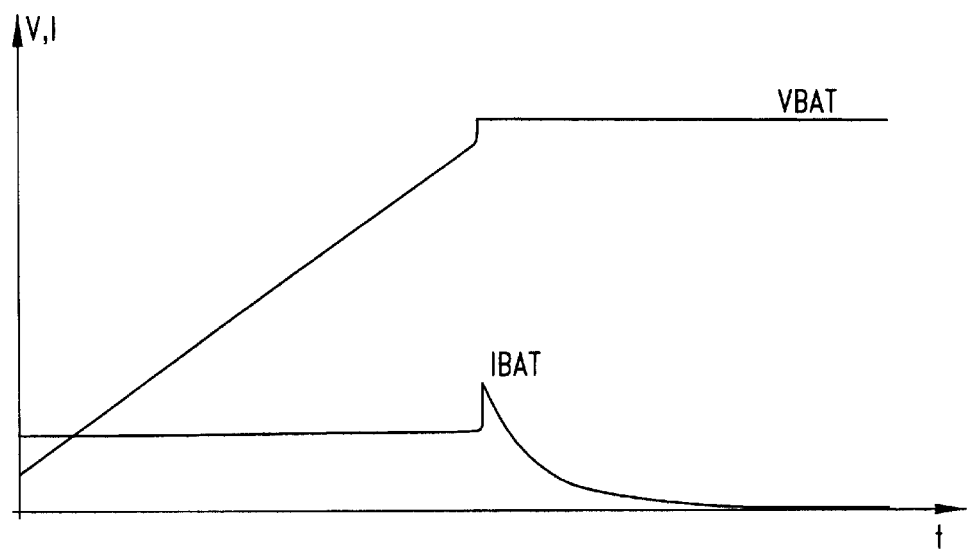
FIG. 4 shows the pattern of the charging current and of the voltage of a battery charged using the DC-DC converter of FIG. 1.
Figure 5:
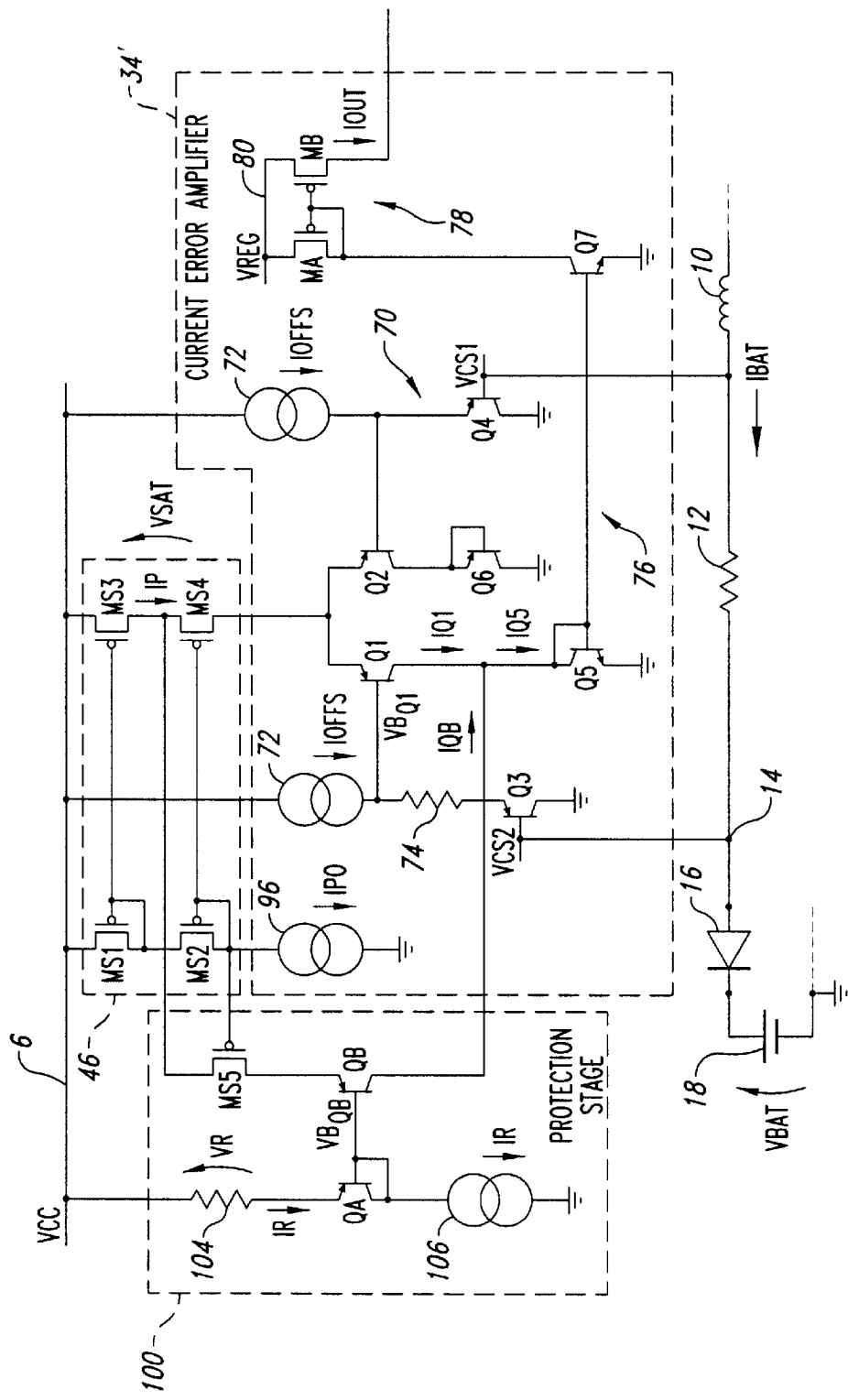
FIG. 5 shows a detailed circuit diagram of an amplifier forming part of a DC-DC converter according to the present invention.

FIG. 5 illustrates the circuit diagram of a current error amplifier made according to the present invention, in which parts that are identical or equivalent to those of the current error amplifier illustrated in FIGS. 2 and 3 are defined with the same reference numbers.

In particular, according to the present invention, the current error amplifier, indicated as a whole with the number 34', differs from the current error amplifier 34 in that it comprises a protection stage 100 connected in parallel to the current generator 46.

In particular, the protection stage 100 comprises two transistors, QA and QB, which have the same area and are of the same type as the transistors Q1 and Q2 of the input stage 70. In particular, the transistor QA is diode-connected and presents a emitter terminal connected to a resistor 104, in turn connected to the supply line 6, a collector terminal connected to a current generator 106, in turn connected to ground and supplying a constant reference current IR, and a base terminal connected to its own collector terminal and to the base terminal of the transistor QB. The transistor QB further presents a collector terminal connected to the collector terminal of the transistor Q1 and a emitter terminal connected to the drain terminal of an NMOS transistor MS5 having a size corresponding to half the size of the transistor MS4. The transistor MS5 moreover presents a gate terminal connected to the drain terminal of the transistor MS2 and a source terminal connected to the drain terminal of the transistor MS3 and to the source terminal of the transistor MS4, and has the purpose of protecting inversely the base-emitter junction of the transistor QB.

Operation of the current error amplifier 34' is as follows. As long as the voltage VCS2 of the base terminal of the transistor Q3, which is proportional to the battery voltage VBAT, is sufficiently lower than the voltage VCC, the DC-DC converter supplies to the battery 18 a constant charging current IBAT. In fact in this situation, the base voltage $VB_{QB}$ of the transistor QB is much greater than the base voltage $VB_{Q1}$ of the transistor Q1, that is:

$$VB_{QB} >> VB_{Q1} = VCS2 + VBE_{Q3} + VOFFS = VBE_{Q2} = VCS1 + VBE_{Q4}$$

and hence the current flowing in the transistor QB is zero, and the bias current IP is shared equally between the two branches of the input stage 70, i.e., in the transistors Q1 and Q2 there flows a current equal to IP/2, and the current IOUT, which is equal to the current IQ5, in that the current mirror 76 presents a unity mirror ratio, is also equal to IP/2.

As the battery voltage VBAT increases, and hence as the voltage VCS2 increases, also the base voltages of the transistors Q1 and Q2 increase, and, when these are close to the base voltage of the transistor QB, then part of the current IP will start to circulate also in the transistor QB. In the transistor Q5 there will thus flow a current that is equal to the sum of the currents flowing in the transistors Q1 and QB, that is IQ5=IQ1+IQB.

In particular, as the battery voltage VBAT increases, the voltage error amplifier 30 tends to go from the condition of unbalance, in which it is, to the condition of equilibrium, itself supplying the current necessary for maintaining the output node 32 in equilibrium. In these conditions, the current IOUT supplied by the current error amplifier 34' tends to decrease progressively, and this decrease thus leads also to the decrease of the current IQ5.

Since, however, the bias current IP of the input stage 70 is constant, the decrease of the current IQ5, which is the sum of the currents flowing in the transistor Q1 and in the transistor QB, inevitably brings about a decrease of the current flowing in the transistor Q1, which will therefore be smaller than the current flowing in the transistor Q2.

This causes the base-emitter voltage of the transistor Q1 to be greater than the base-emitter voltage of the transistor Q2, and consequently, since the offset voltage VOFFS is constant, the input stage 70 of the current error amplifier 34' becomes unbalanced so as to cause a decrease in the charging current IBAT.

In this phase, the voltage VOFFS is greater than the difference between the voltage VCS1 and the voltage VCS2, and hence the battery voltage VBAT will grow up to a certain value at which the charging current IBAT becomes zero.

In this way, then, the battery 18 is unable to be completely charged to the full charge value VFIN; however, it is protected from current peaks that may deteriorate its performance.

Since the battery charging current is zero, in this final phase we will have $$VCS1 = VCS2 \text{ and } VBE_{Q1} - VBE_{Q2} = VOFFS$$

Consequently, once the current IR supplied by the current generator 106 is fixed, appropriate sizing of the resistor 104 enables interruption of the battery charging phase without the current exceeding the typical value programmed.

Figure 6:
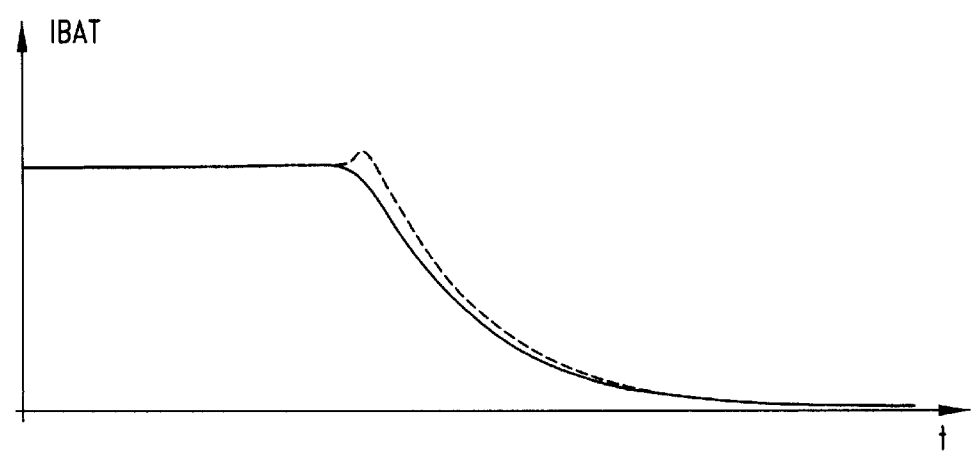
FIG. 6 shows the pattern of the charging current of a battery charged using the DC-DC converter according to the present invention.

FIG. 6 shows the patterns, as a function of time, of the charging current IBAT both for the case in which the sizing of the resistor 104 is optimal (continuous line) and for the case in which the resistor 104 presents a value lower than the optimal one (dashed line). As may be noted, in the case where the sizing of the resistor 104 is optimal, the peak is no longer present on the charging current IBAT, whilst in the case where the resistor 104 presents a value lower than the optimal one, the charging phase is in any case interrupted, and the current presents a peak having a much smaller amplitude than the one that occurs in the DC-DC converter 1.

It is emphasized that the protection stage 100 intervenes only when, by mistake, anomalous application conditions are set, i.e., when the full charge voltage VFIN to which the battery 18 is to be charged is very close to the voltage VCC, whereas it remains inhibited in normal conditions of application for which proper operation of the DC-DC converter is guaranteed.

From this point of view, optimal sizing of the resistance of the resistor 104 assumes a non-negligible importance, in so far as if, on the one hand, a resistance value smaller than the optimal one only manages to limit the current peaks, on the other hand a resistance value greater than the optimal one would cause interruption of the battery charging phase too soon, thus reducing the dynamics of values within which the DC-DC converter operates properly right up to the end phase of charging.

The optimal value of the resistance Rr of the resistor 104 can be derived analytically from the following expression:

$$VR + VBE_{QA} = VBE_{QB} + VDS_{MS5} + VDS_{MS3}(sat)$$

where VR is the voltage across the resistor 104, $VBE_{QA}$ and $VBE_{QB}$ are the base-emitter voltages of the transistors QA and QB, $VDS_{MS5}$ is the drain-source voltage of the transistor MS5 (corresponding to a few dozen mV), and $VDS_{MS3}(sat)$ is the limit saturation drainsource voltage of the transistor MS3 beyond which the transistor MS3 itself starts to operate in the triode region.

Using the above analytical relation and with the support of a simulator, it is thus possible to size the value Rr of the resistor 104 appropriately.

The advantages of the DC-DC converter 1' are the following. First, the protection stage presents a circuit topology that is simple and comprises a limited number of electronic components, and enables a protection to be provided to the DC-DC converter and to the battery that this charges when the conditions of application are anomalous, on the one hand safeguarding the life of the battery, which would otherwise undergo considerable operating stresses, and on the other hand, not reducing the dynamics within which the DC-DC converter operates correctly in normal conditions of application.

In addition, the consumption of the protection stage is very limited in that it consists solely of the current that flows in the resistor 104.

Finally, it is clear that modifications and variations can be made to the DC-DC converter 1' described and illustrated herein without thereby departing from the sphere of protection of the present invention.

For example, the bias current IP, and consequently the reference current IPO upon which the former depends, might not have a constant value but may present a value correlated to the differential input voltage $\Delta V = VREF - VFB$ present between the noninverting and inverting terminals of the voltage error amplifier 30. In this way, the bias current IP supplied to the current error amplifier 34' would decrease progressively as the battery voltage VBAT reaches its full charge value VFIN, consequently causing the current error amplifier 34' to turn off gradually and naturally at the end of the battery charging phase, this guaranteeing that under normal conditions of application of the DC-DC converter for which proper operation is ensured, a charging current IBAT of a constant value is supplied until the full charge voltage VFIN is reached.

While a preferred embodiment of the invention has been illustrated and described, it is to be understood that various changes may be made therein without departing from the spirit and scope of the invention. Thus, the invention is to be limited only by the scope of the claims that follow and the equivalents thereof.

What is claimed is:

1. A DC-DC converter usable as a battery charger, comprising: current error amplifier means and voltage error amplifier means connected to control the charging phase of a battery, during which a charging current is supplied to the battery to bring the voltage of the battery gradually up to a full charge voltage, said current error amplifier means comprising a supply line set at a supply potential, and charging interruption means to reduce and avoid peaking of said charging current of said battery before the voltage of the battery has reached said full charge voltage, and activation means to activate said charging interruption when the difference between said full charge voltage and said supply potential reaches a predetermined value.

2. The DC-DC converter of claim 1 wherein said interruption means comprise current reduction means to reduce said charging current of said battery.

3. The DC-DC converter of claim 2 wherein said current error amplifier means comprise a differential input stage and first current generating means supplying one first bias current for said differential input stage; and said current reduction means define a current shunting path set in parallel to said input stage to shunt part of said first bias current supplied to said input stage.

4. The DC-DC converter of claim 3 wherein said activation means comprise enabling means for enabling said current shunting path when the voltage of the battery presents a second relation with said supply potential.

5. The DC-DC converter of claim 1 wherein said current error amplifier means comprise an input stage including first and second transistor means connected in differential configuration and presenting first terminals connected together, second terminals connected to respective loads, and control terminals, and said current generating means comprise third, fourth, fifth, and sixth transistor means, said sixth transistor means presenting a control terminal connected to a control terminal of said fourth transistor means, a first terminal connected to said first terminals of said first and second transistor means and a second terminal connected to a first terminal of said fifth transistor means, said fifth transistor means presenting a second terminal connected to said supply line, and a control terminal connected to a control terminal of said third transistor means, said fourth transistor means further presenting a first terminal connected to second current generating means supplying a reference current and a second terminal connected to a first terminal of said third transistor means, said third transistor means further presenting a second terminal connected to said supply line; and further comprising seventh and eighth transistor means, said seventh transistor means being diode-connected and presenting a first terminal connected to third current generating means supplying a second reference current, a second terminal connected to resistor means connected in turn to said supply line, and a control terminal connected to its own first terminal and to a control terminal of said eighth transistor means, said eighth transistor means further presenting a first terminal connected to said first terminal of said first transistor means and a second terminal connected to said first terminal of said fifth transistor means and to said second terminal of said sixth transistor means.

6. The DC-DC converter of claim 5 wherein said seventh and eighth transistor means present the same area as said first and second transistor means.

7. The DC-DC converter of claim 5 wherein said seventh and eighth transistor means are of the same type as said first and second transistor means.

8. The DC-DC converter of claim 5, further comprising ninth transistor means interposed between said eighth transistor means and said first and second terminals of said fifth and, respectively, of said sixth transistor means.

9. The DC-DC converter of claim 8 wherein said ninth transistor means present a first terminal connected to said second terminal of said eighth transistor means, a second terminal connected to said first and second terminals of said fifth and, respectively, of said sixth transistor means, and a control terminal connected to said first terminal of said fourth transistor means.

10. The DC-DC converter of claim 1 wherein said current error amplifier means and said voltage error amplifier means share the same output stage.

11. A method for charging a battery, comprising: supplying a charging current to the battery to bring the voltage of the battery gradually up to a full charge voltage, said charging being carried out using a DC-DC converter comprising current error amplifier means and voltage error amplifier means connected together, said current error amplifier means comprising a supply line set at a supply potential, and further comprising reducing the charging current of said battery before the voltage of said battery has reached the full charge voltage and thereby avoid peaking of the charging current when the difference between said full charge voltage and said supply potential reaches a predetermined value.

12. The method of claim 11, for current error amplifier means comprising a differential input stage and first current generating means supplying a first bias current for said differential input stage; and wherein said current reduction means define a current shunting path set in parallel to said input stage to shunt part of said first bias current supplied to said input stage.

13. The method of claim 12, further comprising enabling said current shunting path when the difference between the voltage of the battery and said supply potential reaches a predetermined value.

14. A circuit for charging a battery, comprising:
   a charging circuit configured to provide a current at a predetermined voltage to the battery;
   a current error circuit coupled to the charging circuit and configured to regulate current supplied by the charging circuit to the battery during a charging phase; and
   a protection circuit coupled to the current error circuit and configured to reduce the charging current to avoid the charging current rising above a predetermined current value when the difference between a supply voltage and the voltage on the battery is a predetermined voltage value.

15. The circuit of claim 14 wherein the current error circuit includes a current generator, and wherein the protection circuit is coupled in parallel to the current generator.

16. The circuit of claim 15 wherein the protection circuit comprises a resistor element having a first terminal coupled to the supply voltage and a second terminal, a current mirror coupled to the second terminal of the resistor and further coupled to a current source, and a transistor having a source terminal coupled to a first terminal of the current generator, a gate terminal coupled to a second terminal of the current generator, and a drain terminal coupled to the current error circuit.

17. The circuit of claim 16 wherein the resistor is sized to permit the charging current to peak to a predetermined current value during the charging phase.

18. The circuit of claim 16 wherein the resistor is sized to maintain charging current at a constant value during the charging phase.

19. The circuit of claim 16 wherein the current error circuit includes a differential pair of first and second transistors, and further wherein the current mirror of the protection circuit comprises third and fourth transistors, the third and fourth transistors having the same area as the first and second transistors of the differential pair.

20. The circuit of claim 19 wherein the first and second transistors of the differential pair are of the same type as the third and fourth transistors of the current mirror.

21. A circuit for regulating a battery charger, comprising: current error amplifier means and voltage error amplifier means connected together and adapted to control the charging phase of the battery during which a charging current is supplied to the battery to bring the voltage of the battery gradually up to a full charge voltage, the current error amplifier means coupled to a supply line set at a supply potential, and a charging interruption means to reduce the charging current of the battery before the voltage of the battery has reached the full charge voltage, and activation means to activate the charging interruption means when the difference between the full charge voltage and the supply potential reaches a predetermined value, the current error amplifier means comprising: an input stage including first and second transistor means connected in differential configuration and presenting first terminals connected together, second terminals connected to respective loads, and control terminals; and the current generating means comprise third, fourth, fifth, and sixth transistor means, the sixth transistor means presenting a control terminal connected to a control terminal of the fourth transistor means, a first terminal connected to the first terminals of the first and second transistor means, and a second terminal connected to a first terminal of the fifth transistor means, the fifth transistor means presenting a second terminal connected to the supply line, and a control terminal connected to a control terminal of the third transistor means, the fourth transistor means further presenting a first terminal connected to second current generating means supplying a reference current and a second terminal connected to a first terminal of the third transistor means, the third transistor means further presenting a second terminal connected to the supply line; and further comprising seventh and eighth transistor means, the seventh transistor means being diodeconnected and presenting a first terminal connected to third current generating means supplying a second reference current, a second terminal connected to resistor means connected in turn to the supply line, and a control terminal connected to its own first terminal and to a control terminal of the eighth transistor means, the eighth transistor means further presenting a first terminal connected to the first terminal of the first transistor means and a second terminal connected to the first terminal of the fifth transistor means and to the second terminal of the sixth transistor means.

22. The circuit of claim 21 wherein the interruption means comprise current reduction means to reduce the charging current of the battery.

23. The circuit of claim 22 wherein said current error amplifier means comprise a differential input stage and first current generating means supplying one first bias current for said differential input stage; and said current reduction means define a current shunting path set in parallel to said input stage to shunt part of said first bias current supplied to said input stage.

24. The circuit of claim 23 wherein the activation means comprise enabling means for enabling the current shunting path when the voltage of the battery presents a second relation with the supply potential.

25. The circuit of claim 21 wherein the seventh and eighth transistor means present the same area as the first and second transistor means.

26. The circuit of claim 21 wherein the seventh and eighth transistor means are of the same type as the first and second transistor means.

27. The circuit of claim 21, further comprising ninth transistor means interposed between the eighth transistor means and the first and second terminals of the fifth and, respectively, of the sixth transistor means.

28. The circuit of claim 27 wherein the ninth transistor means present a first terminal connected to the second terminal of the eighth transistor means, a second terminal connected to the first and second terminals of the fifth and, respectively, of the sixth transistor means, and a control terminal connected to the first terminal of the fourth transistor means.

29. The circuit of claim 21 wherein the current error amplifier means and the voltage error amplifier means share a same output stage.

30. A circuit for charging a battery, comprising:

a charging circuit configured to provide a current at a predetermined voltage to the battery;

a current error circuit coupled to the charging circuit and configured to regulate current supplied by the charging circuit to the battery during a charging phase, the current error circuit including a current generator; and a protection circuit coupled in parallel to the current generator and configured to reduce the charging current to avoid the charging circuit rising above a predetermined current value when the difference between a supply voltage and the voltage on the battery is a predetermined voltage value, the protection circuit comprising a resistor element having a first terminal coupled to the supply voltage and a second terminal, a current mirror coupled to the second terminal of the resistor and further coupled to a current source, and a transistor having a source terminal coupled to a first terminal of the current generator, a gate terminal coupled to a second terminal of the current generator, and a drain terminal coupled to the current error circuit.

31. The circuit of claim 30 wherein the resistor is sized to permit the charging current to peak to a predetermined current value during the charging phase.

32. The circuit of claim 30 wherein the resistor is sized to maintain charging current at a constant value during the charging phase.

33. The circuit of claim 30 wherein the current error circuit includes a differential pair of first and second transistors, and further wherein the current mirror of the protection circuit comprises third and fourth transistors, the third and fourth transistors having the same area as the first and second transistors of the differential pair.

34. The circuit of claim 33 wherein the first and second transistors of the differential pair are of the same type as the third and fourth transistors of the current mirror.

* * * * *